Feb. 10, 1953   F. W. SEYBOLD   2,627,723
ROTARY, MULTIPLE TURBINE HYDRAULIC COUPLING
Original Filed Oct. 11, 1949   2 SHEETS—SHEET 1

INVENTOR
FREDERICK W. SEYBOLD
By Toulmin & Toulmin
ATTORNEYS.

Feb. 10, 1953 F. W. SEYBOLD 2,627,723
ROTARY, MULTIPLE TURBINE HYDRAULIC COUPLING
Original Filed Oct. 11, 1949 2 SHEETS—SHEET 2

INVENTOR
FREDERICK W. SEYBOLD
By
Toulmin & Toulmin
ATTORNEYS.

Patented Feb. 10, 1953

2,627,723

UNITED STATES PATENT OFFICE 2,627,723

ROTARY, MULTIPLE TURBINE HYDRAULIC COUPLING

Frederick W. Seybold, Westfield, N. J.

Original application October 11, 1949, Serial No. 120,649, now Patent No. 2,548,272, dated April 10, 1951. Divided and this application May 12, 1950, Serial No. 161,682

6 Claims. (Cl. 60—54)

This invention relates to automatic variable speed transmissions, particularly of the type adapted for transmitting power from an engine to the driving wheels of an automotive vehicle. More particularly still, this invention is concerned with that type of transmission which utilizes a fluid coupling and to an improved and novel design of fluid coupling therefor.

Automatic transmissions of the type referred to are well known in the art and may generally be divided into two groups. The first group has a fluid coupling and gear sets, such as planetary gear sets, which are equipped with brakes and clutches for providing the various driving ratios between the input and output shafts. Due to the fact that brakes and clutches are employed for changing from one driving ratio to another, noticeable steps are obtained as the changes in speed ratio occur due to the operation of said clutches and brakes.

The second group of transmissions employs torque converters and gear sets, but, due to the lower efficiency of the converters, additional gear sets are generally required for reverse operation and for the higher torque requirements. The inefficiency of this type of unit causes the generation of a great deal of heat and this, in turn, requires cooling facilities for the hydraulic fluid which represents an expense and a complication.

In connection with both types of transmissions referred to, fairly elaborate controls are required and this, of course, is expensive and also a source of trouble during the life of the transmission.

A particular object of this invention is the provision of a transmission of the type referred to having a new and novel design of fluid coupling which substantially eliminates the need for clutches and brakes for effecting changes in the driving ratio of the transmission.

Another object is the provision of a novel type of fluid coupling especially adapted for use with an automatic transmission which substantially eliminates noticeable steps when the transmission changes from one driving ratio to another.

It is also an object of this invention to provide a fluid coupling of general utility having a plurality of output members which become successively effective during operation of the transmission for providing driving ratio changes.

These and other objects and advantages will become more apparent upon reference to the following description taken in connection with the accompanying drawings in which.

Figure 1:
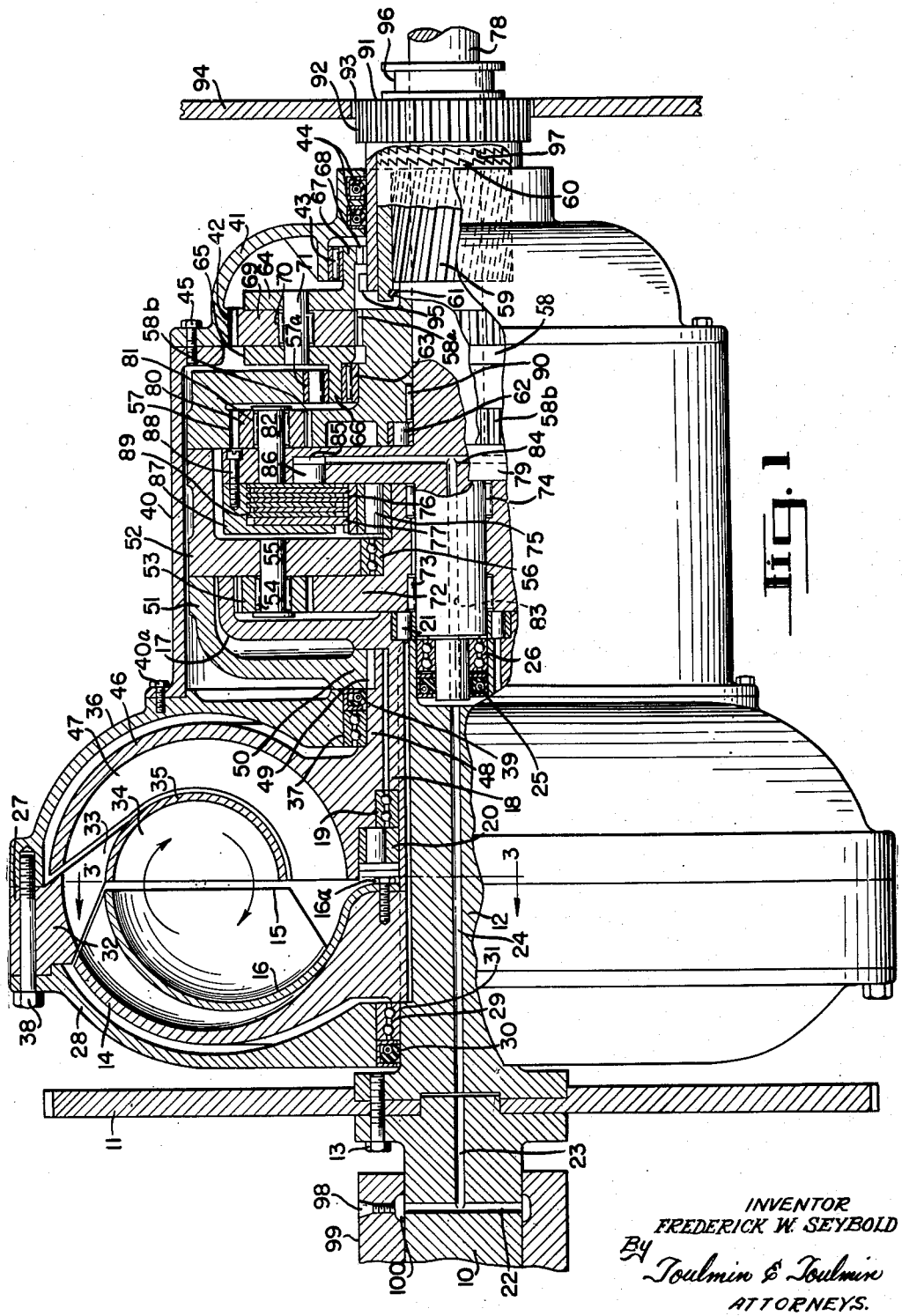
Figure 1 is a vertical longitudinal section through a fluid coupling and transmission according to this invention.

The combination of the novel fluid coupling and automatic transmission according to my invention comprises what may be referred to as eight assemblies or units, an assembly or unit comprising connected parts capable of rotating at a different speed from the other assemblies of the transmission. The units may, of course, be held stationary at certain instances.

The detailed construction of the transmission and its operation are fully set forth in my copending application, Serial No. 120,649, filed October 11, 1949, now Patent No. 2,548,272, issued April 10, 1951, and of which the instant application is a division, but a brief résumé of the construction will be given here in order to make this disclosure complete in every respect.

Driving assembly

The driving assembly comprises the drive shaft 10 to the flanged end of which is secured the engine starter gear 11 and the long multiple-splined shaft 12 by the bolts 13. To said multiple splines is secured the torus shaped impeller 14 which is provided with radial vanes or partitions 15.

Figure 2:
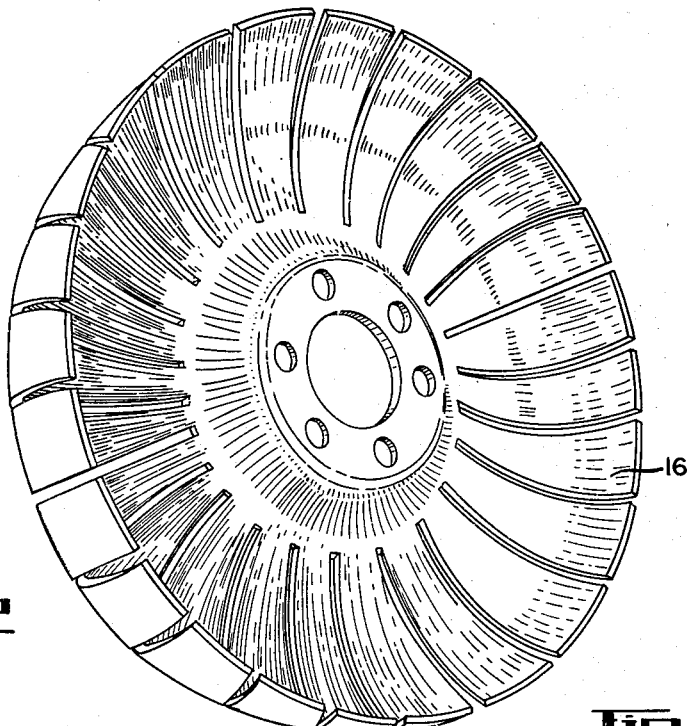
Figure 2 is a perspective view showing the yieldable shell forming a part of the fluid coupling of the transmission.
Figure 4:
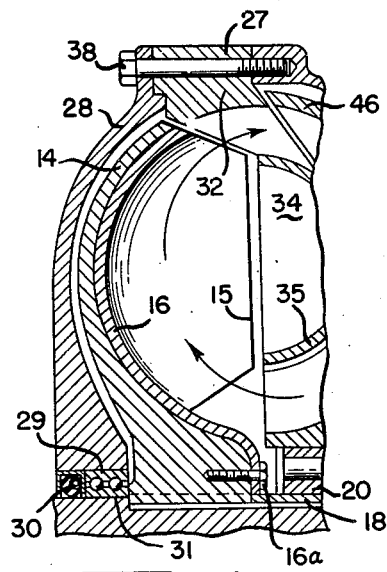
Figure 4 is a fragmentary view of a part of the fluid coupling showing the yieldable shell after it has yielded to its outermost position.
Figure 3:
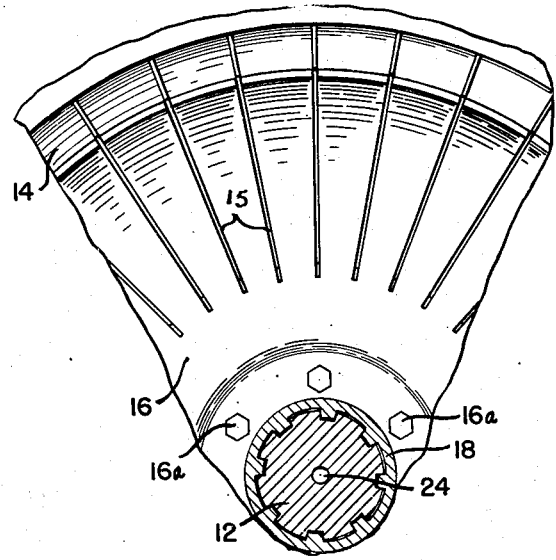
Figure 3 is a fragmentary view indicated by line 3—3 on Figure 1 and showing the arrangement of the flexible shell in the impeller of the coupling.

A somewhat smaller impeller 16 (see Figure 2) is provided with radial slots into which the vanes 15 project. This impeller is made of spring steel of suitable thickness and strength so that it will flex or yield to the centrifugal force exerted by the circulating oil of the fluid coupling. This impeller 16 is fastened to the impeller 15 by the bolts 16a.

An internal gear 17 provided with a long multiple-splined hub 18 is also secured to the long shaft 12. A ball bearing 19 and one element of an overrunning clutch 20 is carried on the left hand end of the long hub 18. At the extreme right hand end one element of an overrunning clutch 21 is secured.

The drive shaft 10 and the long shaft 12 are provided with oil passages 22, 23 and 24 respectively. The right hand end of the shaft 12 is recessed to receive an oil seal 25 and a ball bearing 26.

Primary floating assembly

The primary floating assembly consists of the multiple section casing 27. The left hand section 28 essentially conforms to the shape of the impeller 14 and is supported on the ball bearing 29 and contains the oil seal 30, both of which operate on the enlarged section 31 of the shaft 12.

The next section 32 consists of the radial vanes 33 and 34, also the torus-shaped shell 35, forming a hydraulic runner which cooperates with the impeller elements 14, 15 and 16.

The third section 36 is shaped to contain the third element of this hydraulic coupling and is supported on the ball bearing 37. The three sections 28, 32 and 36 are bolted together by the screws 38. An oil seal 39 serves to confine the fluid in the coupling and is fitted into the casing 36.

The fourth section 40 is a long flanged shell which is secured to section 36 by the bolts 40a. The last section 41 is provided with an internal gear 42, a needle bearing 43 and oil seals 44 and it is secured to section 40 by the screws 45.

Secondary floating assembly

The secondary floating assembly comprises three sections, the first section being the third element of the hydraulic coupling, i. e. the runner 46 to which the radial vanes 47 are attached. The hub 48 of this runner is journalled in the inner race of the ball bearing 37. The right hand end of hub 48 has multiple splines 49 which co-act with the internal spline teeth 50 of the shell 51.

The second section comprises the planet pinion carrier 52 which is secured to the shell 51 by screws not shown. Two or more planet pinions 53 are free to turn on needle bearings 54 on the studs 55 secured in the carrier 52. A ball bearing 56 supports the carrier 52. The other elements of the overrunning clutch 20 are confined in the hub of the runner 46.

The third section comprises the internal gear 57 with one element of an overrunning clutch 57a. This internal gear is fastened to member 52 by screws not shown.

Reaction assembly

The reaction assembly consists of the duplex sun gear 58 which has a hub extending to the right, on the external surface of which are formed right hand multiple helical threads 59, and these are engaged by similar multiple helical threads formed within the bore of the multiple teeth brake 60. The left hand end of member 60 is provided with a stop ring 61 which limits the movement of brake 60 to the right for a purpose to be described later. The outer member of an overrunning clutch 62 is confined in the left hand end of the duplex sun gear 58. A needle bearing 63 is located about midway between the teeth of duplex sun gear 58.

Reverse assembly

The reverse assembly comprises a two-piece planetary pinion carrier 64 and 65. The left hand section 65 has a hub 66, the outside of which carries one element of the overrunning clutch 57a and on the inside is mounted the outer race of the needle bearing 63. The right hand section 64 also has a hub 67, the outside of which carries the inner race of needle bearing 43, while the bore of the hub is provided with internal brake teeth 68. Planet pinions 69 are journalled on needle bearing 70, the latter being carried on pins 71 which are secured in the carriers 64 and 65. The planet pinions 69 mesh with the internal gears 42 and 58a of the duplex sun gears 58.

"High gear" assembly

The "high gear" assembly consists of the sun gear 72 which meshes with the planet pinions 53. The bore of gear 72 is provided with needle bearings 73 and 74. The inner race of ball bearing 56 is also mounted on the long hub of gear 72, as well as the inner member of an overrunning clutch 75, and whose outer member is fitted into the bore of an externally toothed pinion 76, the teeth of which serve to drive the multiple clutch plates 77.

Driven assembly

The driven assembly comprises the driven shaft 78, the left hand end of which is journalled in the ball bearing 26 and co-acts with the oil seal 25. The inside member of the over-running clutch 21 is also supported on the driven shaft 78 as well as the needle bearings 73 and 74 of the sun gear 72. Integral with the shaft 78 is the planet pinion carrier 79.

Planet pinions 80 are journalled on needle bearings 81, the latter being carried by the headed pins 82 which are secured in the planet pinion carrier 79. Planet pinions 80 mesh with the internal gears 57 and 58b of the duplex sun gears 58.

A longitudinal oil passage 83 is provided in the shaft 78 which aligns with the oil passage 24 of the driving assembly. Radial oil passages 84 lead from passage 83 to the small cylinders 85 in the carrier body 79. Small pistons 86 are slidably fitted in the cylinders 85 and these pistons respond to oil pressure.

An internal gear 87 is fastened by the screws 88 to the carrier 79, whose internal teeth drive the multiple clutch plates 89, which alternate with the clutch plates 77 of the "high gear" assembly. Needle bearings 90 journal the duplex sun gear 58 on the shaft 78.

The inner member of overrunning clutch 62 is integral with driven shaft 78 and this clutch prevents the latter from turning in the reverse direction at a speed greater than that of the duplex sun gear 58, or if this sun gear is locked, the driven shaft 78 is prevented from turning in reverse and this feature is usually referred to as "no-roll-back."

Control assembly

The control assembly comprises the slidable brake member 91, the position of which relative to the brake 60 and internal brake 68 determines the various speed ratios which will be described later. Member 91 is provided with external spline teeth 92 which are slidably mounted in the internal spline teeth 93 of the stationary transmission casing 94. The member 91 extends to the left into the section 41 of the primary floating assembly and thereby provides a cylindrical surface for the oil seals 44 and at its extreme left it is provided with external brake teeth 95 which may be engaged with the internal brake 68 when member 91 is moved to the right by means of well-known shifting mechanisms attached to and operated from the steering wheel column and terminating in the groove 96 of the member 91.

Member 91 is also provided with a bore into which the cylindrical surface of the multiple toothed brake 60 is snugly fitted with only sufficient clearance for an oil film, the reason therefore will be described later. The bore of member 91 terminates with a vertical face on which the multiple teeth 97 are formed for engagement with the brake 60.

As previously mentioned the pistons 86 are actuated by hydraulic oil pressure to condition the multiple friction disc clutch plates 77 and 89 for transmitting power and upon release of this oil pressure the clutch plates will separate and consequently transmit no power.

The source of this hydraulic pressure is usually a pump (not shown) whose high pressure fluid is conducted by pipes to a threaded fitting 98 on bearing 99 in which an annular groove 100 is provided whereby the oil may gain entrance into the ports 22 of the drive shaft 10.

Associated with the control lever and actuated thereby is a valve (not shown) which controls the flow of pressure oil to the cylinders 85 or permits drainage therefrom.

Operation

For neutral or idling operation sliding brake member 91 is positioned in its intermediate position as by a suitable control lever on the steering column. In this position teeth 97 and brake teeth 60 will not engage, and the fluid pressure is exhausted from cylinder 85. Similarly, the brake teeth 68 and 95 are prevented from engagement. Under these conditions, the driven shaft 78 will be at rest and the duplex sun gear 58 and the reverse assembly will be free to rotate.

Forward operation is obtained by shifting the slidable brake member leftwardly of its Figure 1 position so that brake teeth 97 will be within reach of the brake teeth 60. Pressure fluid is also conducted to cylinders 85 for locking clutch plates 77 and 89 together.

Duplex sun gear 58 is now stationary and the drive is from the impeller of the fluid coupling to the runner 33, 34, 35 and its internal gear 42 through the reverse assembly to the output shaft.

The car at this time is moving in its lowest gear ratio with the impeller of the fluid coupling revolving at relatively low speed and the centrifugal force of the oil circulating in the coupling is as yet insufficient to bring about yielding of the flexible impeller.

The internal gear 17 rotating at drive shaft speed and pinion carrier 52 driven by the internal gear impart a speed to sun gear 72 less than the speed of driven shaft 78, the overrunning clutch 75 permitting the driven shaft to rotate faster than the sun gear 72.

As the engine speed is increased and the centrifugal force of the circulating oil in the fluid coupling also increases, the flexible impeller will begin to deflect and a portion of the oil will enter vanes 47 of runner 46, thereby increasing its speed and commencing to transmit the torque thereto. As this action continues, runner 46 increases its speed until it takes over the drive through gear train 56, 60, 58b. The duplex sun gear 58 continues to remain stationary and the overrunning clutch 57 permits the secondary floating assembly to overrun the reverse assembly.

The speed ratio of the transmission has now been substantially changed but it will be observed that this has occurred without any noticeable shock or jar. With a further increase in the speed of impeller 16, a further deflection of its curved sections will occur and the speed of the runner 46 will be correspondingly increased and this speed increase will be transmitted to sun gear 72.

A still further increase in the speed of the sun gear 72 will bring about a direct drive from sun gear 72 through overrunning clutch 75 and clutch plates 77 and 89 to driven shaft 78, thereby placing the transmission in its highest driving ratio.

When quick acceleration is desired, fluid pressure may be exhausted from cylinders 85 thereby releasing clutch plates 77 and 89. This may be accomplished manually or automatically as by a valve responsive to accelerator setting or to a combination of the accelerator setting and the speed of the vehicle.

Releasing of the clutch plates will increase the driving ratio through the transmission, and should conditions be such that the speed of runner 46 drops to about 70 per cent of the speed of runner 33, 34, 35, the power will again be transmitted through the primary floating assembly until such time as runner 46 can again commence driving.

For reverse operation, member 91 is shifted to its extreme right-hand position bringing brake teeth 95 into engagement with brake teeth 68 thus arresting the rotation of the reverse assembly.

The drive is now from impeller 14, 15, 16 to the primary runner 33, 34, 35 and through internal gear 42 to duplex sun gear 58, the said sun gear rotating in a direction opposite to that which obtains during forward operation of the vehicle.

Duplex sun gear 58 will drive internal gear 57 which will cause the secondary floating assembly to rotate and transmit power to output shaft 78.

From the foregoing it will be evident that I have devised an automatic transmission and a novel fluid coupling therefor such that a plurality of speed ratios in the forward direction can be obtained entirely without the use of clutches and brakes and complex control arrangements therefor. A single, simply constructed, adjustable braking element is effected for selectively placing the transmission in forward, neutral, or reverse operation. No sliding bands or other devices, other than the overrunning clutches referred to and the multiple disc clutch, are required.

Referring to the fluid coupling, the yieldable shell 16 thereof is subject to certain modifications in order to adapt it to different conditions of operation and usages. For example, as illustrated and described, the entire flexible shell is adapted for yielding at the same time. It will be evident, however, that under certain conditions it may be desirable that various parts of the shell yield at different speeds. This may be accomplished by modifying selected ones of the individual fingers or blades of the flexible shell so they yield at a different speed from the others thereof. This could be utilized in certain instances to make the transition of the transmission from one speed ratio to another even more gradual than is now obtained.

The yieldable shell has been illustrated as yieldable by the centrifugal force of the oil acting thereon, but it will be evident that the individual parts of the shell, or certain selected ones thereof, could be weighted, or otherwise modified so that a predetermined force would be developed thereon for causing the shell to yield due to the rotational speed of the impeller. In this case the shell would be yieldable under the joint influence of the rotational speed of the impeller and the centrifugal force of the oil acting thereon. In general, there will be a fixed relationship between these factors, but in certain types of couplings as, for example, the type in which the oil level is selectively varied, it might be desirable to provide an actuating influence on the yieldable shell apart from the influence of the circulating oil thereon.

It will be understood that this invention is susceptible to modification in order to adapt it to different usages and conditions and, accordingly, it is desired to comprehend such modifications within this invention as may fall within the scope of the appended claims.

I claim:

1. In a fluid coupling; an impeller having radial partitions, a plurality of concentric runners rotatable relative to each other and to said impeller and each having a semi-toroidal shell with partitions, and curved means on the impeller extending between the partitions thereof and forming a shell smaller than the impeller with its outer peripheral edge normally located in axial alignment with the outer edge of the shell of the inner runner and closely adjacent thereto so the impeller is normally effectively coupled with only the inner of the runners, said curved means being secured to the impeller adjacent its hub and having its outer peripheral edge free for movement whereby a predetermined radial thrust on said means will cause it to yield outwardly and couple the impeller with others of said runners.

2. In a fluid coupling having a casing, an impeller in the casing having radial partitions, a pair of concentric runners in the casing rotatable relative to each other and to said impeller, each runner having a semi-toroidal shell and partitions, a resilient inner shell member secured to said impeller adjacent the hub thereof and having curved fingers extending between the partitions, said shell member being of substantially the same shape as said impeller but smaller and the outer edges of said fingers being normally axially aligned with the outer edge of the shell of the inner of said runners whereby the impeller is normally coupled with only the inner one of the runners, said shell member being yieldable in response to a predetermined outward thrust on the fingers thereof to effect coupling of the impeller with the outer one of said runners.

3. In a fluid coupling having a casing, an impeller in the casing having radial partitions, a pair of concentric runners in the casing also having partitions rotatable relative to each other and to said impeller, and a resilient inner shell member secured to said impeller adjacent the hub thereof and having curved fingers extending between the partitions, said shell member being of substantially the same shape as said impeller but smaller whereby the impeller is normally coupled with only the inner one of the runners, said shell member being yieldable in response to a predetermined outward thrust on the fingers thereof to effect coupling of the impeller with the outer one of said runners, said casing being connected to one of said runners and an output member rotatable in the casing connected to the other runner.

4. In a fluid coupling; a casing defining an annular cavity, an impeller rotatable in the casing and comprising radial partitions, a pair of concentric runners in the casing also having partitions, the inner thereof having means extending from its outer edge and connected to said casing and the other comprising an output part extending axially through the casing at one side, and a yieldable shell in the impeller connected thereto adjacent the hub, said shell comprising curved fingers extending between the partitions and terminating in a circular path adjacent the outer edge of the said inner runner whereby the impeller is normally coupled with only the inner runner but whereby, also, the fingers will yield outwardly at a predetermined speed of said impeller to bring about coupling of the impeller with the outer runner.

5. In a fluid coupling; a casing defining an annular cavity, an impeller rotatable in the casing and comprising radial partitions, a pair of concentric runners in the casing also having partitions, the inner thereof having means extending from its outer edge and connected to said casing and the other comprising an output part extending axially through the casing at one side, and a yieldable shell in the impeller connected thereto adjacent the hub, said shell comprising curved fingers extending between the partitions and terminating in a circular path adjacent the outer edge of the said inner runner whereby the impeller is normally coupled with only the inner runner but whereby, also, the fingers will yield outwardly at a predetermied speed of said impeller to bring about coupling of the impeller with the outer runner, the said means connecting the inner runner with the casing comprising circumferentially spaced ribs to admit oil to the outer runner when the said fingers yield.

6. In a fluid coupling; a pair of runners each having a shell with partitions, said shells being concentric and substantially semi-circular in cross-section whereby they form substantially one-half of a toroidal cavity, an impeller comprising a shell with partitions and said shell forming the remainder of the toroidal cavity except for an outer annular portion, a casing surrounding said impeller and runners and having an inwardly projecting annular part extending into said portion and completing said toroidal cavity, ribs connecting said part with the inner of said runners, and yieldable deflector means on the impeller normally deflecting the oil pumped thereby into the inner runner and yieldable to permit the pumped oil to pass into the outer runner.

FREDERICK W. SEYBOLD.

REFERENCES CITED

The following references are of record in the file of this patent:

UNITED STATES PATENTS

| Number | Name | Date |
|---|---|---|
| 2,061,997 | Dunn | Nov. 24, 1936 |
| 2,074,170 | Dunn | Mar. 16, 1937 |
| 2,284,123 | Breer et al. | May 26, 1942 |
| 2,378,353 | Zeider | June 12, 1945 |
| 2,428,134 | Zeider | Sept. 30, 1947 |
| 2,536,842 | Duffield | Jan. 2, 1951 |